United States Patent [19]

Traub

[11] 3,727,138

[45] Apr. 10, 1973

[54] ARRANGEMENT FOR INDICATING FIELD STRENGTH AT THE INPUT OF AN FM RECEIVER

[75] Inventor: Karl Traub, Furth, Germany

[73] Assignee: Grundig E.M.V. Elektro-Mechanische, Furth/Bay, Germany

[22] Filed: Nov. 20, 1970

[21] Appl. No.: 91,251

[30] Foreign Application Priority Data

Nov. 29, 1969 Germany....................P 19 60 022.7

[52] U.S. Cl.....................................325/347, 325/455

[51] Int. Cl...............................................H04b 1/16

[58] Field of Search......................307/260, 263, 317; 324/131, 132; 325/318, 319, 344, 345, 347, 348, 349, 398, 455

[56] References Cited

UNITED STATES PATENTS

| | | | |
|---|---|---|---|
| 2,507,735 | 5/1950 | Peterson | 325/345 X |
| 2,159,240 | 5/1939 | Wheeler | 325/398 X |
| 3,263,170 | 7/1966 | Schneider | 324/131 |
| 3,307,101 | 2/1967 | Byles | 324/131 X |
| 2,874,354 | 2/1959 | Bell | 324/131 X |
| 2,276,565 | 3/1942 | Crosby | 325/485 X |

*Primary Examiner*—Benedict V. Safourek
*Attorney*—Michael S. Striker

[57] ABSTRACT

The collectors of intermediate frequency amplifiers are connected in common via a common resistor to the supply. A D.C. measuring instrument connected across the common resistor is an indication of the field strength at receiver input.

7 Claims, 2 Drawing Figures

PATENTED APR 10 1973 3,727,138

BY

INVENTOR.
KARL TRAUB
By. [illegible]
Attorney

ARRANGEMENT FOR INDICATING FIELD STRENGTH AT THE INPUT OF AN FM RECEIVER

BACKGROUND OF THE INVENTION

This invention relates to an arrangement for indicating the field strength at the input of an FM receiver. Conventional arrangements for indicating field strength over a wide region of small to large antenna input voltages are embodied in the Scott receiver 312/D and the Marantz receiver Model 18, 1968/69. In these receivers, the antenna input voltage is indicated by rectifying the signal voltages appearing at the primary or secondary circuits or the outputs of the deadbeat stages of the intermediate frequency amplifier, adding the so-obtained D.C. voltages and and feeding the resulting sum voltage to an indicator. This type of arrangement necessitates an interference in the high frequency transmission path of the receiver. When the signal voltages are derived from the primary or secondary circuits of the intermediate amplifiers, a de-tuning of the tuned circuits results which varies with voltage and causes an undesirable phase modulation and thereby a decrease in the AM suppression. This effect takes place even if even Germanium diodes are used instead of silicon diodes, although the Germanium diodes have a lower characteristic capacity and a rectification characteristic which commences at lower voltages than that of a silicon diode. Also, a damping of the tuned circuits and thereby of a decrease of the circuit Q results from the use of these diodes. The above-mentioned disadvantages are obviated when the signal voltages obtained at the deadbeat stages of an intermediate frequency limiting amplifier. However in this case, the rather large effect of temperature on the characteristics of Germanium diodes cause the field strength indicator to exhibit a thermal dependency. In any case, a rather large amount of equipment is required both in diodes and switching elements and including the elements for de-coupling of the individual demodulation circuits when adding the individual signal voltages.

SUMMARY OF THE INVENTION

It is the object of this invention to furnish an arrangement for indicating field strength at the input of an FM receiver which does not have the above-mentioned drawbacks.

This invention is thus an arrangement for indicating field strength at the input of an FM receiver, said receiver having intermediate frequency stages, each of said stages having an amplifier element with an output electrode and a control electrode. The receiver further comprises a voltage source having a supply terminal. In accordance with this invention, the output electrodes of said amplifier elements are connected to a common point and resistance means are connected between said common point and said supply terminal. Further, indicator means for indicating the D.C. voltage across said resistance means are connected across said resistance means. The indication on said indicator means is an indication of the field strength appearing at the input of said FM receiver on a logarithmic scale. This results from the fact that increasing field strength at the input of the FM receiver causes an increase in the limiting action of the amplifiers, thereby increasing the collector currents in some or all of the stages of the intermediate frequency amplifier. This increase in collector current causes an increase in the voltage drop across the common resistor. This voltage drop is indicated on a D.C. indicator and furnishes a logarithmic measure of the field strength appearing at the input of the amplifier. The present invention is based on the idea that the average collector D.C. current in the limiter stages of the intermediate frequency amplifier increases for an increasing A.C. base voltage because of the rectification in the base-emitter circuit which commences with the limiting action, as well as the fact that this process does not occur simultaneously in all limiter stages but occurs in one limiter stage after the other in dependence on the amplitude of the antenna input voltage. Thus, a logarithmic indication of the antenna input voltage which may vary within wide bounds, may be obtained by adding the collector currents and causing these currents to flow over a common resistance and indicating the voltage drop across this common resistance, by means of a D.C. indicator.

It will be noted that in this arrangement, the actual signal transmission is not interfered with at all since the arrangement depends solely on D.C. values. Thus the reception characteristics of the receiver are not affected at all. As will become obvious in the description of the preferred embodiments below, the arrangement in accordance with this invention requires little equipment and still achieves a better accuracy than the previously-known arrangements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
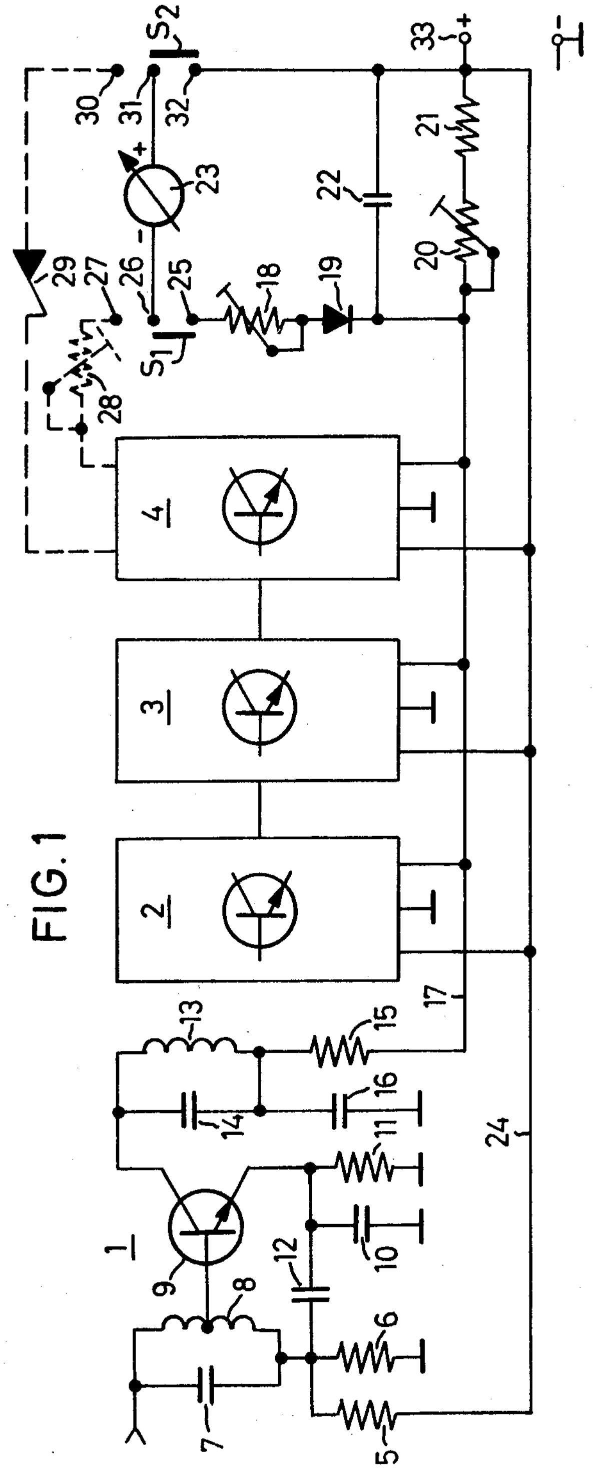
FIG. 1 shows a circuit arrangement in accordance with the present invention.

FIG. 1 shows four limiter stages of an intermediate frequency amplifier, of which the first stage, namely stage 1, is shown in detail, while the subsequent stages, namely stages 2, 3 and 4, are shown in block form only. The input signal is derived from a tuned circuit comprising a capacitor 7 and an inductance 8. The inductance 8 has a tap connected to the base of the transistor 9. The common point of the capacitor 7 and inductance 8 is further connected to the voltage divider tap of voltage divider means comprising a resistance 5 and 6 whose common point constitutes said voltage divider tap. Resistor 6 has one terminal connected to ground potential, while resistor 5 has its other terminal connected to the positive supply terminal labeled 33, via a line 24. A capacitor 12 is connected from the voltage divider tap to the emitter of transistor 8 which in turn is connected to ground potential via a parallel combination of a capacitor 10 and a resistance 11. A capacitor 14, in parallel with an inductance 13, constitutes a tuned circuit in the collector circuit of transistor 9 and connected to ground via a capacitor 16 and connected via a resistance 15 to a line 17 whose significance will be explained later.

Stages 2 through 4 are constructed similarly to stage 1 and are therefore shown as blocks only. The collector circuits of these stages are, as explained relative to stage 1, connected with line 17, while the voltage divider means connected with each of these stages for furnishing the bias voltages for the bases are connected between ground and the positive supply terminal 33 via a line 24.

The operation of this circuit will now be explained with reference to the drawing. It must be remembered that the collector currents in stages 1 through 4 will increase when the transition into the limiter region is reached for increasing field strengths at the input of the receiver. The sum of the collector currents of these four stages of the intermediate frequency amplifier will cause a voltage drop when flowing through the common resistances 20 and 21 whose slowly-increasing amplitude will be indicated by measuring instrument 23 and thus constitute a measure for the input field strength. The instrument may be calibrated. Variable resistor 20 may be used in conjunction with the characteristics of diode 19 to adjust the zero point, while resistor 18 is used to calibrate the maximum deflection of instrument 23 taking place at full limiting. If it is assumed that stage 4 of the intermediate frequency amplifier contains a frequency discriminator as is usually the case, then instrument 23 may also serve as a tuning indicator. This is indicated by contacts 30 and 31 of switch S2 which connects to stage 4 via a diode 29, which diode is preferably a Zener diode. Further, the negative terminal of the measuring instrument is connected to stage 4 via contacts 27 and 26 of switch S1 and a variable resistor 28.

Figure 2:
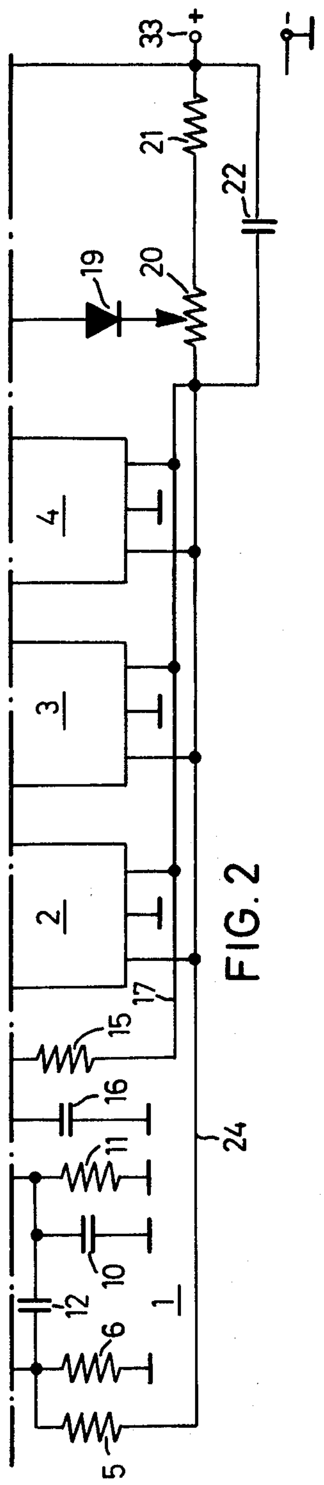
FIG. 2 shows a variation of the arrangement shown in FIG. 1.

FIG. 2 shows a variation of the circuitry in FIG. 1. Insofar as not indicated, the circuit is identical to the circuit shown in FIG. 1. The only difference is that in FIG. 2, line 17 and line 24, are both connected to the common point. Therefore, the current through the voltage divider means furnishing the bias voltages for the base circuits, also flows through the common resistors, namely resistors 20 and 21. It will be noted that in this case resistor 20 is a potentiometer rather than a variable resistor. The sensitivity of this arrangement is somewhat less than the sensitivity of the arrangement of FIG. 1. However, because of the negative feedback, the stability of this arrangement is better than that of FIG. 1.

While the invention has been illustrated and described as embodied in an arrangement for indicating field strength at the input of an FM receiver, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In an FM receiver having an input, and a voltage supply with a voltage supply terminal, a field strength measuring arrangement comprising, in combination, a plurality of intermediate frequency stages, each of said stages limiting in response to a corresponding field strength at said input differing from the corresponding field strength at which the others of said stages limit, each of said stages having an amplifier element having a maximum D.C. current upon limiting in said stage, each of said amplifier elements having an output electrode and a control electrode, connecting means connecting said output electrodes to a common point; resistance means connected between said common point and said supply terminal; and calibrated D.C. indicator means connected across said resistance means, whereby the numerical indication on said indicator means constitutes a quantitative measure for the field strength at the said input.

2. An arrangement as set forth in claim 1, wherein said resistance means comprise calibrating resistor means for calibrating said D.C. indicator means.

3. An arrangement as set forth in claim 2, further comprising diode means; first variable resistor means for adjusting the maximum deflection of said calibrated D.C. indicator means, and connecting means series-connecting said calibrated D.C. indicator means, said first variable resistor and said diode means in parallel with said resistance means.

4. An arrangement as set forth in claim 3, wherein said calibrating resistor means comprise a second variable resistor for adjusting the minimum indication on said calibrated D.C. indicator means.

5. An arrangement as set forth in claim 3, wherein said diode means comprise a silicon diode.

6. An arrangement as set forth in claim 1, wherein said amplifier elements comprise transistors, said output electrodes being the collectors of said transistors and said control electrodes being the bases of said transistors.

7. An arrangement as set forth in claim 6, further comprising a plurality of voltage divider means each having a first voltage divider terminal connected to a reference potential, a voltage divider tap connected with one of said bases of said transistors, and a second voltage divider terminal; and means connecting said second voltage divider terminals to said common point.

* * * * *